(12) United States Patent
Glenner et al.

(10) Patent No.: US 11,616,820 B2
(45) Date of Patent: *Mar. 28, 2023

(54) PROCESSING FILES FROM A MOBILE DEVICE

(71) Applicant: MICROSOFT TECHNOLOGY LICENSING, LLC, Redmond, WA (US)

(72) Inventors: Steven C. Glenner, Bellevue, WA (US); Curtis G. Wong, Medina, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 392 days.

This patent is subject to a terminal disclaimer.

(21) Appl. No.: 16/536,488

(22) Filed: Aug. 9, 2019

(65) Prior Publication Data

US 2020/0036764 A1  Jan. 30, 2020

Related U.S. Application Data

(63) Continuation of application No. 14/799,306, filed on Jul. 14, 2015, now Pat. No. 10,432,684, which is a continuation of application No. 13/538,702, filed on Jun. 29, 2012, now Pat. No. 9,106,759, which is a continuation of application No. 11/097,719, filed on Mar. 31, 2005, now Pat. No. 8,225,335.

(60) Provisional application No. 60/641,562, filed on Jan. 5, 2005.

(51) Int. Cl.
| | |
|---|---|
| H04L 29/06 | (2006.01) |
| H04L 65/60 | (2022.01) |
| H04M 3/493 | (2006.01) |
| H04M 1/72415 | (2021.01) |
| H04L 67/5683 | (2022.01) |
| H04M 7/00 | (2006.01) |

(52) U.S. Cl.
CPC .......... *H04L 65/60* (2013.01); *H04L 67/5683* (2022.05); *H04M 1/72415* (2021.01); *H04M 3/493* (2013.01); *H04M 7/006* (2013.01); *H04M 2201/38* (2013.01); *H04M 2207/18* (2013.01); *H04M 2250/64* (2013.01)

(58) Field of Classification Search
None
See application file for complete search history.

(56) References Cited

U.S. PATENT DOCUMENTS

| | | | | |
|---|---|---|---|---|
| 5,737,491 A | * | 4/1998 | Allen ................. | H04N 1/00403 348/211.3 |
| 5,812,736 A | * | 9/1998 | Anderson .......... | H04N 1/00129 386/324 |
| 5,835,571 A | * | 11/1998 | Johnson .................. | H04M 3/42 379/88.01 |
| 5,845,282 A | * | 12/1998 | Alley ..................... | H04L 67/06 |

(Continued)

*Primary Examiner* — Van H Nguyen

(57) ABSTRACT

The presently described subject matter allows the user to interactively browse a collection of electronic files, such as a digital photo collection, remotely using a mobile telephone. Files from the collection of electronic files can be directed from the mobile telephone to be sent to a remote display device, where the file can be displayed. Also, a user can record voice and text annotations from the mobile phone to preserve with an electronic file, and which is transported along with the file when it is displayed on a remote display device.

18 Claims, 4 Drawing Sheets

(56) References Cited

U.S. PATENT DOCUMENTS

| | | | | |
|---|---|---|---|---|
| 6,167,469 A * | 12/2000 | Safai | H04N 1/00209 | 348/157 |
| 6,223,190 B1 * | 4/2001 | Aihara | H04N 5/232933 | 715/234 |
| 6,393,496 B1 * | 5/2002 | Schwaderer | G06F 9/541 | 719/322 |
| 6,567,122 B1 * | 5/2003 | Anderson | H04N 1/00204 | 348/14.01 |
| 6,622,015 B1 * | 9/2003 | Himmel | G06Q 20/322 | 455/414.1 |
| 6,636,259 B1 * | 10/2003 | Anderson | H04N 1/00151 | 348/211.3 |
| 6,715,003 B1 * | 3/2004 | Safai | H04N 1/00209 | 348/207.99 |
| 6,775,560 B2 * | 8/2004 | King | G06Q 30/06 | 455/566 |
| 6,789,109 B2 * | 9/2004 | Samra | G06F 3/048 | 709/220 |
| 6,981,023 B1 * | 12/2005 | Hamilton | H04L 29/12009 | 709/206 |
| 7,076,431 B2 * | 7/2006 | Kurganov | H04L 67/02 | 704/275 |
| 7,194,527 B2 * | 3/2007 | Drucker | G06F 16/435 | 709/220 |
| 7,197,531 B2 * | 3/2007 | Anderson | H04N 1/00148 | 348/207.1 |
| 7,240,003 B2 * | 7/2007 | Charlesworth | G06F 16/3343 | 704/254 |
| 7,307,636 B2 * | 12/2007 | Matraszek | G06F 16/58 | 345/581 |
| 7,334,026 B2 * | 2/2008 | Samra | G11B 27/034 | 709/220 |
| 7,366,979 B2 * | 4/2008 | Spielberg | G10L 15/26 | 715/230 |
| 7,376,441 B2 * | 5/2008 | Lee | H04M 1/72415 | 455/556.1 |
| 7,394,969 B2 * | 7/2008 | Sun | G11B 27/034 | 386/248 |
| 7,440,682 B2 * | 10/2008 | Habuta | H04N 9/8042 | 375/E7.004 |
| 7,505,907 B2 * | 3/2009 | Carro | G06F 16/9558 | 704/270.1 |
| 7,536,639 B2 * | 5/2009 | Griswold | G06F 16/955 | 715/234 |
| 7,546,299 B2 * | 6/2009 | Benco | H04W 12/069 | |
| 7,671,902 B2 * | 3/2010 | Mindrum | H04N 1/0018 | 348/231.2 |
| 7,721,301 B2 * | 5/2010 | Wong | G10L 15/26 | 719/322 |
| 8,225,335 B2 * | 7/2012 | Glenner | H04L 65/60 | 719/322 |
| 2002/0010584 A1 * | 1/2002 | Schultz | G06Q 99/00 | 704/270 |
| 2002/0080090 A1 * | 6/2002 | Borgstom | H04L 69/329 | 345/1.1 |
| 2002/0113803 A1 * | 8/2002 | Samra | G11B 27/034 | 345/619 |
| 2003/0040334 A1 * | 2/2003 | Lee | H04M 1/72409 | 455/557 |
| 2003/0117651 A1 * | 6/2003 | Matraszek | G06F 16/58 | 358/1.18 |
| 2003/0144034 A1 * | 7/2003 | Hack | H04M 1/0266 | 455/566 |
| 2003/0233460 A1 * | 12/2003 | Drucker | G06F 16/44 | 709/228 |
| 2004/0001226 A1 * | 1/2004 | Ohtuka | H04N 1/444 | 358/1.15 |
| 2004/0023686 A1 * | 2/2004 | King | H04M 1/72403 | 455/550.1 |
| 2004/0132432 A1 * | 7/2004 | Moores | H04M 1/656 | 455/413 |
| 2004/0179025 A1 * | 9/2004 | Samra | G06F 3/0484 | 345/629 |
| 2004/0210845 A1 * | 10/2004 | Paul | G06F 16/4393 | 715/731 |
| 2005/0028164 A1 * | 2/2005 | Neuwald | G06F 9/541 | 719/310 |
| 2005/0043940 A1 * | 2/2005 | Elder | G06F 16/24522 | 704/9 |
| 2005/0149969 A1 * | 7/2005 | Kumar | H04N 5/44513 | 725/40 |
| 2005/0256870 A1 * | 11/2005 | Benco | H04W 12/069 | |
| 2006/0056599 A1 * | 3/2006 | Cragun | H04M 1/656 | 379/67.1 |
| 2006/0092291 A1 * | 5/2006 | Bodie | H04N 1/00307 | 348/231.99 |
| 2006/0114338 A1 * | 6/2006 | Rothschild | H04N 1/32144 | 348/231.99 |
| 2006/0148500 A1 * | 7/2006 | Glenner | H04L 65/60 | 455/517 |
| 2006/0235700 A1 * | 10/2006 | Wong | G10L 15/26 | 704/275 |
| 2006/0264209 A1 * | 11/2006 | Atkinson | G06F 16/51 | 455/422.1 |
| 2007/0067373 A1 * | 3/2007 | Higgins | G06F 11/3013 | |

* cited by examiner

PROCESSING FILES FROM A MOBILE DEVICE

RELATED APPLICATIONS

This Application is a Continuation of, and claims benefit from, U.S. patent application Ser. No. 14/799,306, now U.S. Pat. No. 10,432,684, that was filed on Jul. 14, 2015 (Issued Oct. 1, 2019), and that is a Continuation of U.S. patent application Ser. No. 13/538,702, now U.S. Pat. No. 9,106,759, that was filed on Jun. 29, 2012 (Issued Aug. 11, 2015), and that is a Continuation of U.S. patent application Ser. No. 11/097,719, (U.S. Pat. No. 8,225,335) that was filed on Mar. 31, 2005 (Issued Jul. 17, 2012), and that is a Non-Provisional of U.S. Provisional Patent Application No. 60/641,562 that was filed on Jan. 5, 2005, each of which is incorporated herein by reference in its entirety.

TECHNICAL FIELD

The following description relates generally to mobile computing devices. More particularly, the following description relates to processing files from a mobile computing device.

BACKGROUND

Mobile electronic devices provide many conveniences to users and, therefore, have become increasingly popular. However, such mobile devices contain memory that is limited as a practical matter. This limitation prevents mobile device users from accessing the bulk of their digital files. For example, the convenience and low cost of modern digital photography technology (digital cameras and/or camera phones) has led to a large portion of the public storing hundreds and thousands of digital image files on their personal computers. But it is cumbersome to retrieve photos and to share them with others, and impossible if the user is not using the computer directly. There are other types of files as well—such as electronic presentation files—that would be convenient to access from mobile devices.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Overview

Figure 1:
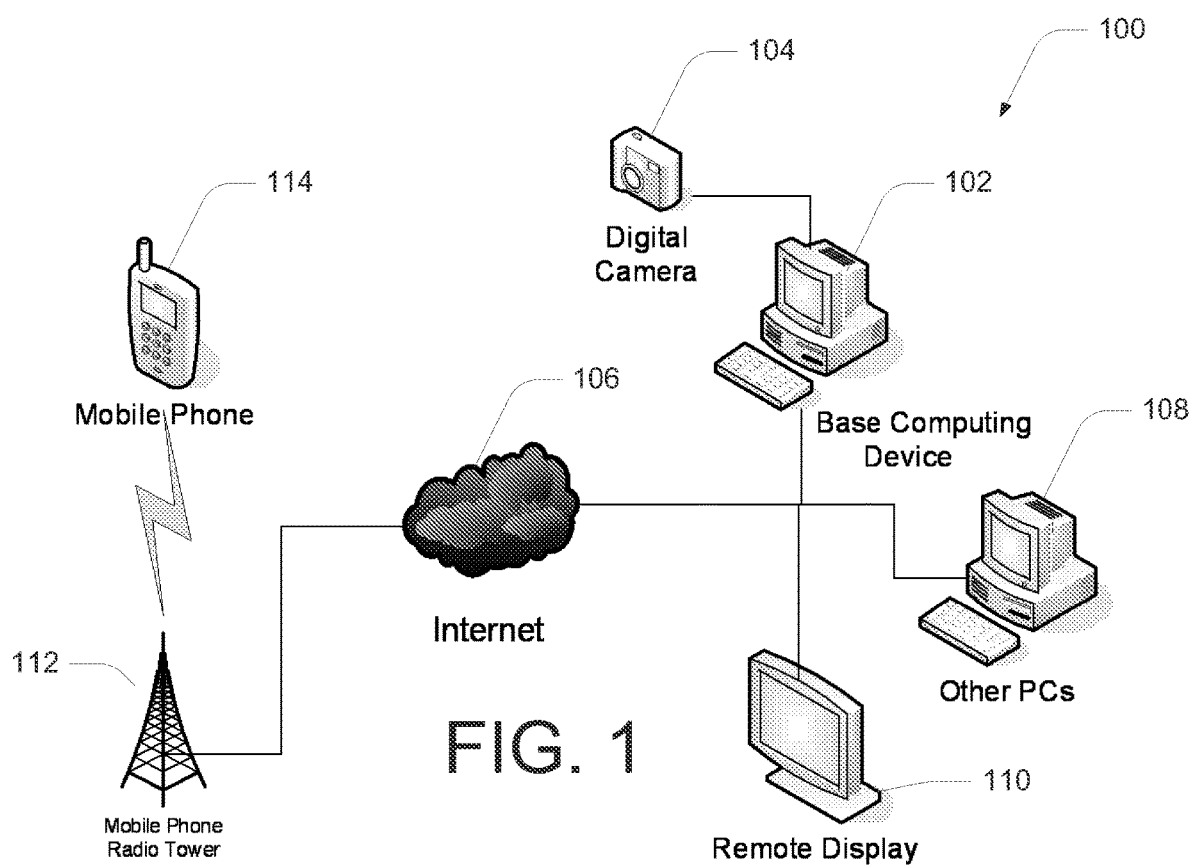
FIG. 1 is a general depiction of an exemplary network system.

The presently described subject matter provides a way for mobile electronic device users to access and manipulate electronic files stored on a computer from their mobile device. Such files may include any digital image files, video files, electronic presentation files, database files, etc. that a user may wish to have access to but are too large to be practically available in mobile device memory.

In at least one implementation described herein, a collection of electronic files can be browsed from a remote location using a mobile device, such as a mobile telephone. The files may also be shared with one or more other computers. For example, a user can interactively browse their entire digital photo collection remotely and to share one or more of these photos with another person's computing device, mobile or otherwise. This allows, for instance, a user to access his digital photos from a mobile telephone and display one or more of the photos on a display device at the user's (or at another) location.

In addition, it is currently somewhat cumbersome to associate a voice or text annotation with a particular photo. In one or more implementations described herein, a user can quickly and easily record a voice or text annotation for a digital image file from a remote location. The annotation is preserved with the image and is transported along with the image in the event that the image is shared with others or displayed on another display device.

Various systems, methods, computer-readable media, techniques, etc., are described that provide several features, including but not necessarily limited to the following features:

1. Capability to browse a remote collection of photos (or other types of electronic files) interactively, by keyword, date/date range, and by representative thumbnails, on a mobile device such as a telephone;

2. Capability to record and play back voice annotations for items in the remote collection on the phone;

3. Capability to add text annotations to items in the remote collection;

4. Capability to share items in the remote collection with one or more other computing devices;

5. Capability to send items in the remote collection to a different remote display device, either located nearby or at a great distance, in real time;

6. Capability to play back voice annotations for items in the remote collection on different remote display device (other than the mobile phone which is directing the playback);

7. Capability at the computing device that stores the remote collection to intelligently scale the size of the file (i.e. photo) and/or video bit rate and frame rate, or to transcode, or change the video encoding method, for the receiving device to reduce network bandwidth requirements and take full advantage of the capabilities of the mobile device;

8. Capability to use keyword annotations applied to one photo to perform searches for related items in the collection;

and

9. Capability to automatically send new pictures or other files created on a mobile device, such as a camera phone, to the base computing device to be included as part of the main collection ("upload capability").

Exemplary Network System

FIG. 1 is a general depiction of an exemplary network system 100. The networks system 100 includes a base computing device 102 and a digital camera 104 connected to the base computing device 102. The base computing device 102 is a computing device, such as a personal computer, that includes a mass storage device, such as a hard disk drive (not shown), that is capable of storing a large amount of electronic files.

The base computing device 102 communicates via a network such as the Internet 106 or an Intranet to remote systems, such as one or more other PCs 108 and one or more remote displays 110. The base computing device 102 may also communicate with a mobile phone radio tower 112 of a mobile phone system via the Internet 106. In turn, the base computing device 102 communicates with any mobile phone 114 that is configured to communicate with the mobile phone radio tower 112.

Exemplary System Architecture & Methodological Implementation

Figure 2:
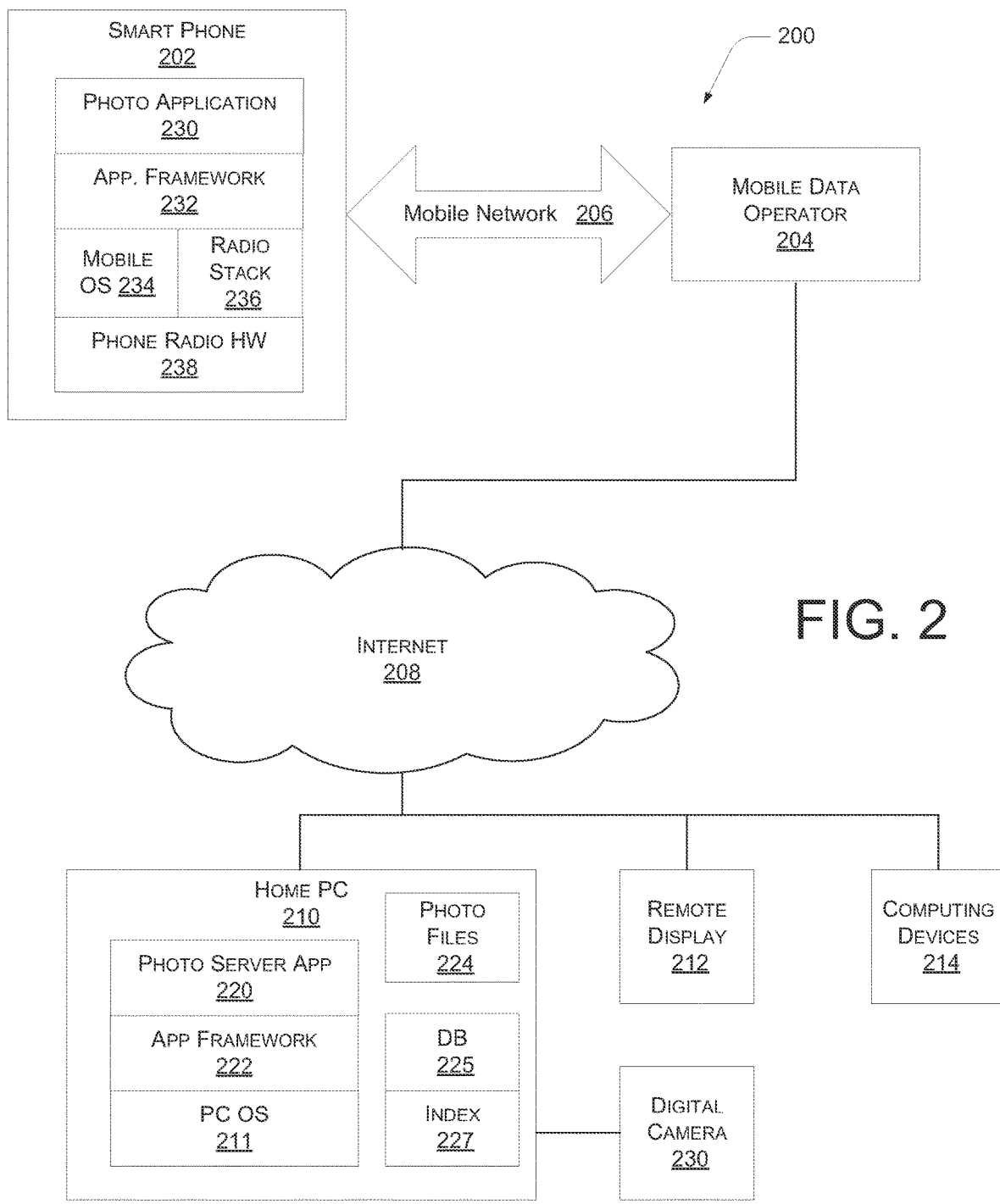
FIG. 2 is a diagram depicting an exemplary system architecture for mobile photo browsing, annotating and sharing.

FIG. 2 is a diagram of an exemplary system architecture 200 in accordance with the present disclosure. The exemplary system architecture 200 includes a smart phone 202 that communicates with a mobile data operator 204 via a mobile network 206. The mobile data operator 204 connects with a network (Internet 208).

A home PC 210 includes an operating system 211 and is configured to communicate with the smart phone 202 via the Internet 208. Although identified as a home PC, the home PC 210 is any computing device that can store a large number of electronic files, such as digital image files, on a mass storage device. One or more peripheral devices, such as a digital camera 212 in the present example, may be connected to the home PC 210. The home PC 210 is also in communication with one or more remote devices via the Internet 208. In the present example, the home PC 210 communicates with a remote display 212 and one or more other computing devices 214.

An application 220 runs within an application framework 222 on the home PC 210 and is configured to locate digital photo files 224 stored on the home PC 210. Although one or more examples used herein refer to digital photo files or digital image files, it is noted that the techniques described herein may be used with any other type of electronic file. For example, electronic slide presentation files may be stored on the home PC 210 and manipulated from a mobile device and/or displayed on a remote display.

Figure 3:
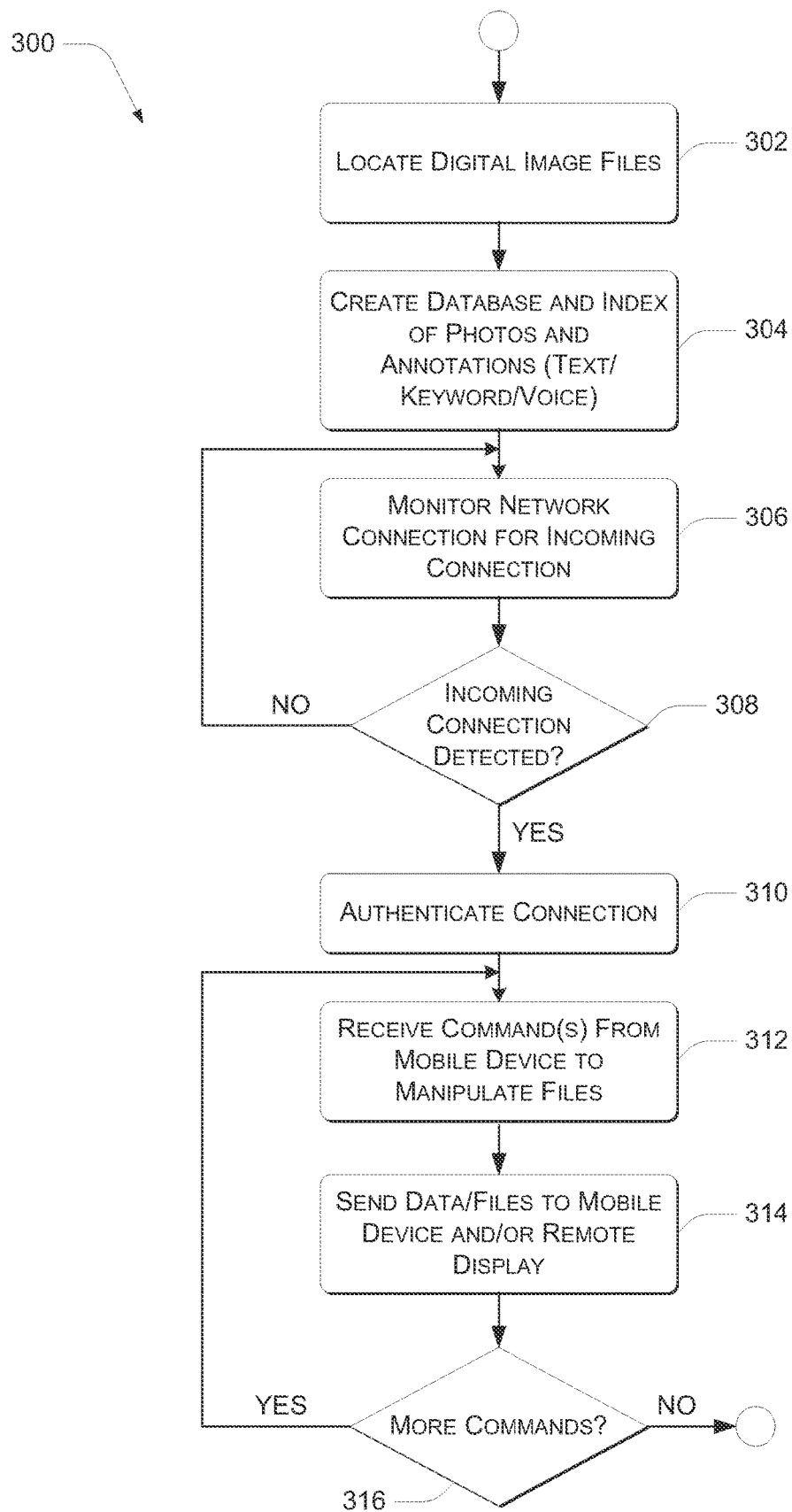
FIG. 3 is a flow diagram that depicts an exemplary methodological implementation of processing electronic files from a mobile device.

FIG. 3 is a flow diagram that depicts an exemplary methodological implementation of processing electronic files from a mobile device. In the following discussion, FIG. 2 and FIG. 3 will be concurrently described to discuss exemplary elements/configurations shown in FIG. 2 and exemplary process steps shown in FIG. 3.

At block 302, the application 220 locates the digital photo files 224 stored on the home PC 210. The application 220 creates a database 225 and index 227 of the photos with any associated text/keyword annotations and/or voice annotations (block 304). At block 306, the application 220 listens on the network (Internet 208) for incoming connections over the Internet 208 from the smart phone 202, or other display devices running an appropriate application.

When a device (phone or other PC or display device) connects ("Yes" branch, block 308), the device is authenticated using a password or other method at block 310. As long as no connection is detected ("No" branch, block 308), the application 220 continues to monitor the network connection for incoming connections.

The device (i.e. the smart phone 202) submits one or more commands to the home PC 210 to perform functions such as sending a list of keywords to the device, sending a particular photo to the device, store a voice recording from the device about a particular photo, etc. (block 312). At block 314, the home PC 210 executes the commands received at block 312 and transmits data and/or files to the device (or some other device) as required by the received commands.

If more commands are detected ("Yes" branch, block 316), then the process reverts to block 312 where the commands are received and processed. The process terminates if there are no other commands to receive and process ("No" branch, block 316).

The smart phone 202 includes a photo application 230 within an application framework 232. The smart phone 202 also includes a mobile operating system 234, a radio stack 236 and miscellaneous phone radio hardware 238. The photo application 230 is configured to run on the smart phone 208 which connects (e.g. through a cellular data network (e.g. GPRS)) to the Internet 208, and via the Internet 208 to the home PC 210. The application 230 sends a password to authenticate a smart phone user. Through a user interface (not shown) on the phone, the user can browse through the photo collection 224 stored on the home PC 210.

Said browsing can be performed by keyword, by viewing a list of keywords and typing out parts of the keywords on the phone's keypad, or by representative thumbnails—where the home PC 210 sends the smart phone 202 a thumbnail corresponding to each keyword known to the application 230. The user then uses the phones keypad to select a thumbnail and the home PC application 220 is configured to then perform a search for items matching that keyword, and send the matching items to the smart phone 202.

Through the smart phone/application user interface (not shown), the user can step through the photos in the search result set and/or can examine metadata (keyword annotations, camera-created data such as date taken, image parameters, etc.). The user can retrieve voice annotations recorded for a photo and/or add new keywords by entering them using the phone's keypad. The user can record new voice annotations using the smart phone 202 and the new voice annotations are transmitted back through the data network (i.e. Internet 208) to the home PC 210 and stored for future retrieval.

Additional computing devices (e.g. computing devices 214) and display devices (e.g. remote display 212) can connect via the Internet 208 to the same photo server application 220 on the home PC 210, and can perform some of the retrieval and browsing operations. When a display device 212 is connected to the home PC 210 in such a way, the user can use the smart phone 202 to send (push) a photo directly to the display device 212. In this way, a "slide show" depicting the electronic files can be operated from the smart phone 202, where the viewing takes place on the remote display 212. Since the display device 212 and home PC 210 are connected by the Internet 208, there is no requirement that the home PC 210, the smart phone 202 and/or the display device 212 be in proximity of each other. In fact, it is expected that a common usage scenario will be for a user to direct the slide show where the display device 212 is in another location entirely, perhaps at the remote end of a long-distance phone call in which the user of the smart phone 202 is participating.

The photo server application 220 on the home PC 210 uses information about a display (either a smart phone 202 display (not shown)) or other display device 212, 214 to appropriately scale the size and quality of the photo to make best use of the network used for transmission. For example, if the smart phone 202 has a display size of 176×220, the application 220 scales down each photo to that size and uses an image compression mechanism with an image quality parameter to reduce the size in bytes of the transmitted image data to only a few kilobytes which can be transmitted in just a few seconds via the GPRS network. For a larger display device such as a laptop computer, the image is pre-scaled to the size of the laptop's display panel, and compressed to take advantage of the faster broadband Internet connection.

Several functions are provided from the smart phone 202. The functions include, but are not limited to:

(1) Performing keyword searches on the photo database;
(2) Looking at the photos in a search result list;
(3) Retrieving and viewing the keywords and metadata for photos;
(4) Easily run related queries for keywords attached to a photo;
(5) Retrieving voice annotations stored with a photo;
(6) Recording new voice annotations for a photo and sending them to the remote database;
(7) Zooming into a portion of a photo (the zooming is done at the server and only the zoomed portion is sent over the network, again using the intelligent scaling and compression to reduce transmission time and bandwidth used);
(8) Viewing an index of thumbnails of either the current query result set, or of thumbnails representing the keywords which can be searched;
(9) Emailing a photo to a contact stored in the phone, or an email address entered using the phone keypad—the phone instructs the home PC 210 to actually send the email with the full or partial image which is a better use of bandwidth than transmitting the larger photo over the GPRS network—the email can optionally include a yoke annotation and a text message entered on the phone;
(10) Submitting the photo for printing by a digital printing service and mailing the finished print to the user or to the address stored in a contact on the phone; and
(11) Performing date-based queries to locate items in the collection.

Exemplary Operating Environment

Figure 4:
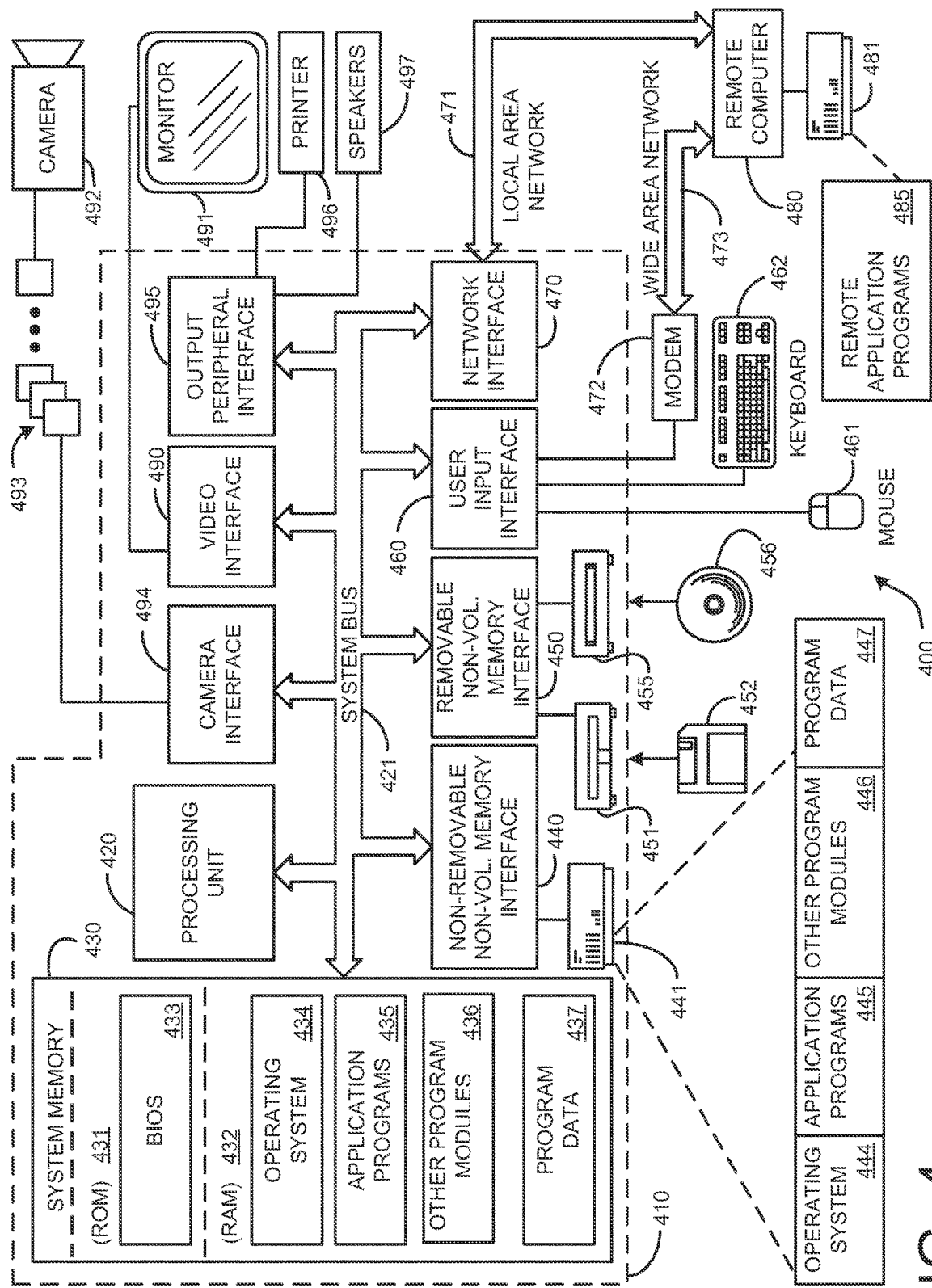
FIG. 4 is a block diagram depicting a general purpose computing environment that may be used in one or more implementations according to the present description.

FIG. 4 is a block diagram depicting a general purpose computing environment 400 that may be used in one or more implementations according to the present description. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modifies or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through anon-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modifies 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495. Of particular significance to the present invention, a camera 463 (such as a digital/electronic still or video camera, or film/photographic scanner) capable of capturing a sequence of images 464 can also be included as an input device to the personal computer 410. Further, while just one camera is depicted, multiple cameras could be included as an input device to the personal computer 410. The images 464 from the one or more cameras are input into the computer 410 via an appropriate camera interface 465. This interface 465 is connected to the system bus 421, thereby allowing the images to be routed to and stored in the RAM 432, or one of the other data storage devices associated with the computer 410. However, it is noted that image data can be input into the computer 410 from any of the aforementioned computer-readable media as well, without requiring the use of the camera 463.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN net environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481, it will be appreciated that the network connections shown are exemplary and other means of establishing a communications link between the computers may be used.

Conclusion

While one or more exemplary implementations have been illustrated and described, it will be appreciated that various changes can be made therein without departing from the spirit and scope of the claims appended hereto.

The invention claimed is:

1. A system including one or more processors for processing files from a mobile device, the system comprising:
   a computing device configured to store a collection of files, wherein the collection of files stored on the computing device is configured for being browsed via the mobile device, and to transmit a file selected by the mobile device to a display device separate from the mobile device and different from a display of the computing device in response to one or more commands submitted to the computing device by the mobile device,
   wherein there is no requirement that the display device and the computing device be in proximity of each other, that the display device and the mobile device be in proximity of each other, or that the computing device and the mobile device be in proximity of each other.

2. The system according to claim 1, wherein the mobile device is in a first location and the display device is in a second location different from the first location.

3. The system according to claim 1, wherein the computing device is configured to scale a size of the file prior to information from the file being depicted by the display device.

4. The system according to claim 1, wherein the computing device is configured to scale a quality of the file prior to information from the file being depicted by the display device.

5. The system according to claim 1, wherein the computing device is configured to store an annotation to a file in the collection of files.

6. The system according to claim 5, wherein the annotation is created by the mobile device and sent to the computing device by the mobile device.

7. The system according to claim 5, wherein the annotation is a text or voice annotation.

8. The system according to claim 5, wherein the computing device is configured to transmit the annotation to the display device.

9. A method for processing files from a mobile device comprising:
   storing, by a computing device, a collection of files, wherein the collection of files stored on the computing device is configured for being browsed via the mobile device; and
   transmitting, by the computing device, a file selected by the mobile device to a display device separate from the mobile device and different from a display of the computing device in response to one or more commands submitted to the computing device by the mobile device, wherein there is no requirement that the display device and the computing device be in proximity of each other, that the display device and the mobile device be in proximity of each other, or that the computing device and the mobile device be in proximity of each other.

10. The method according to claim 9, wherein the mobile device is in a first location and the display device is in a second location different from the first location.

11. The method according to claim 9, further comprising scaling, by the computing device, a size of the file prior to information from the file being depicted by the display device.

12. The method according to claim 9, further comprising scaling, by the computing device, a quality of the file prior to information from the file being depicted by the display device.

13. The method according to claim 9, further comprising storing, by the computing device, an annotation to a file in the collection of files.

14. The method according to claim 13, wherein the annotation is created by the mobile device and sent to the computing device by the mobile device.

15. The method according to claim 13, wherein the annotation is a text or voice annotation.

16. The method according to claim 13, further comprising transmitting, by the computing device, the annotation to the display device.

17. A computing device including one or more processors for processing files from a mobile device, the computing device comprising:
   memory that comprises computer-executable instructions that, based on execution by the computing device, cause the computing device to:
   store a collection of files, wherein the collection of files stored on the computing device is configured for being browsed via the mobile device; and
   transmit a file selected by the mobile device to a display device separate from the mobile device and different from a display of the computing device in response to one or more commands submitted to the computing device by the mobile device, where there is no requirement that the display device and the computing device be in proximity of each other, that the display device and the mobile device be in proximity of each other, or that the computing device and the mobile device be in proximity of each other.

18. The computing device according to claim 17, wherein the mobile device is in a first location and the display device is in a second location different from the first location.

* * * * *